United States Patent [19]
Flachsbarth

[11] 3,710,360
[45] Jan. 9, 1973

[54] HALL GENERATOR SYSTEM FOR READ-OUT OF MAGNETIZED INFORMATION CARRIERS WITH SEVERAL CODE POSITIONS

[75] Inventor: Dieter Flachsbarth, Ruckersdorf, Germany

[73] Assignee: Siemens Aktiengesellschaft, Berlin and Munich, Germany

[22] Filed: April 16, 1971

[21] Appl. No.: 134,743

[30] Foreign Application Priority Data

May 13, 1970 Germany....................P 20 23 237.5

[52] U.S. Cl..................340/174.1 H, 307/309, 330/6
[51] Int. Cl...............................................G11b 5/38
[58] Field of Search...............340/174.1 D, 174.1 H; 179/100.2 CH; 330/6; 307/309

[56] References Cited

UNITED STATES PATENTS 3,370,246 2/1968 O'Brien..................................330/6
3,200,207 8/1965 Reiner et al.................179/100.2 CH
3,037,092 5/1962 Neumann et al...........179/100.2 CH

*Primary Examiner*—Vincent P. Canney
*Attorney*—Curt M. Avery, Arthur E. Wilfond, Herbert L. Lerner and Daniel J. Tick

[57] ABSTRACT

A system for reading magnetized information carriers with several code positions comprises a number of Hall generators, a signal input circuit with a capacitor which has a discharge circuit connected across the capacitor and comprises a controllable semi-conductor switching member, preferably a thyristor. An inductive transformer has its primary winding connected in series with the switching member. Several secondary windings of a transformer are connected with the control-current terminals of the respective Hall generators. An electronic control device, which is to respond to the code pulses of the input circuit, is connected to the Hall electrode pairs of the respective Hall generators.

3 Claims, 4 Drawing Figures

HALL GENERATOR SYSTEM FOR READ-OUT OF MAGNETIZED INFORMATION CARRIERS WITH SEVERAL CODE POSITIONS

My invention relates to a circuit system for reading data from a magnetized information carrier having several code positions, the reading being effected with the aid of Hall generators.

The electric control of industrial operations, for example the filling of tank cars from storage tanks, requires the checking of measuring data before, during and after the filling operation, the measuring data, furnished from measuring mechanisms, must be supplied in suitable form to electric, preferably electronic, control equipment.

Applicable for this purpose are magnetic code discs or the like magnetizable carriers which are coupled with a mechanical measuring mechanism and which are read out with the aid of Hall generators. Code discs and the like data carriers operating with Hall generators are known as such, for example, from the book by H. Weiss "Structure and Application of Galvanomagnetic Devices," published by Pergamon Press, New York, 1969. For avoiding errors when reading the data from a multi-position code disc of this type, all of the code positions of the disc or other data carrier must be read simultaneously.

As a rule, the Hall voltage produced at the Hall generators is so low that amplifying stages must be provided for controlling the electronic control device that is to respond to the code pulses. Such amplifying stages constitute potential sources of trouble.

It is therefore desirable to increase the Hall voltage so that it becomes suitable for a direct control of the electronic control equipment. It is known that electrical switching members when controlled by pulses rather than by a continuous voltage can withstand a considerably higher power than the rated power. Consequently, by applying a pulsewise control of the control current passing through a Hall generator, this current can be increased so greatly that the Hall generator will furnish a Hall voltage sufficient for the direct control of electronic control devices.

In my co-pending U.S. applications, Ser. No. 8,25585 filed May 19, 1969 Now U. S. Pat. No. 3,603,821 and Ser. No. 26222 filed Apr. 7, 1970 now U.S. Patent No. 3,644,760 there are described and illustrated various circuit arrangements for pulsing the control current of Hall generators. In these circuit systems the Hall-electrode circuits of the Hall generators are either directly, or through the control circuit of the Hall generator, limited to a given electrical potential. The circuitry for pulsing the control current of the Hall generators on the one hand, and the electronic control device, on the other hand, may be connected to different voltage sources; or the Hall-circuits of several Hall generators are usually connected to different pulse circuits which act in parallel relation to one another upon an electronic control device. For these reasons it is necessary that the Hall-electrode circuits of the Hall generators be free of impressed electrical potentials. In the German monthly periodical "Siemens-Zeitschrift" of Feb. 1966, pages 130–133, there is described a contactless device for reading data from a roller-type counting mechanism with the aid of an E-shaped read-out head whose two outer legs, constituted by permanent magnets, are so arranged as to magnetic polarity that in the middle leg, containing a Hall generator, the magnetic fluxes of the two permanent magnets are directed in opposition to each other. Arranged on the roller-type counting mechanism, there are soft iron plates in two tracks, to serve as yoke for the magnetic flux. When the read-out head passes by the roller-type counting mechanism, the magnetic circuit, dependent upon the position of the soft-iron plate, is closed, either between the upper leg and the middle leg, or between the lower leg and the middle leg of the read-out head. Consequently positive and negative Hall-voltage pulses are generated in time sequence and are available for controlling a data-evaluating or a like processing device. A parallel read-out of several code positions is not possible with such a device.

It is an object of my invention to provide a circuit system of the initially described general type that affords a simultaneous reading of all code positions of an information carrier and in which the Hall-electrode circuits of the Hall generators, are potential-free.

To this end, and in accordance with our invention, the discharge circuit of a chargeable capacitor connected in the signal input circuit, comprises a controllable semi-conductor member in series with the primary winding of an inductive transformer. The transformer has a number of secondary windings corresponding to the number of code positions. Each of these secondary windings is connected to the control-current circuit of a Hall generator whose pair of Hall electrodes is connected to the controlling input circuit of an electronic control device.

According to another feature of my invention a blocking diode is connected in the control-current circuit of each Hall generator. This prevents in a simple manner any faulty pulses from reading the Hall generators, such faults coming about by excessive oscillations of the voltage furnished by the inductive transformer.

If a measuring data is composed of several digital positions, for example, several decades, then a corresponding circuit system is coordinated to each of the digital positions, and the individual circuit systems are read-out one after the other in a corresponding sequence.

According to a further feature of my invention the individual circuit systems for the serial reading of data are combined with one another by having connecting in series Hall-electrode circuits of those Hall generators that are connected to the respective secondary windings coordinated to the same code positions.

According to an alternative feature of the invention, a combination system is obtained by connecting one Hall electrode of the respective Hall generators to a common return main, and having the other Hall electrodes — of those Hall generators that are connected to secondary windings coordinated to the same respective code positions of the information carrier — connected with a control bus or lead through respective decoupling diodes coordinated to the particular secondary windings.

The above-mentioned and further objects, advantages and features of my invention, said features being set forth in the claims annexed hereto will be described in or will become apparent from the following description in conjunction with the accompanying drawings in which:

FIG. 1 exemplifies a circuit diagram of a Hall generator system according to the invention which is provided with thyristors as semiconductors switching members.

Figure 1:
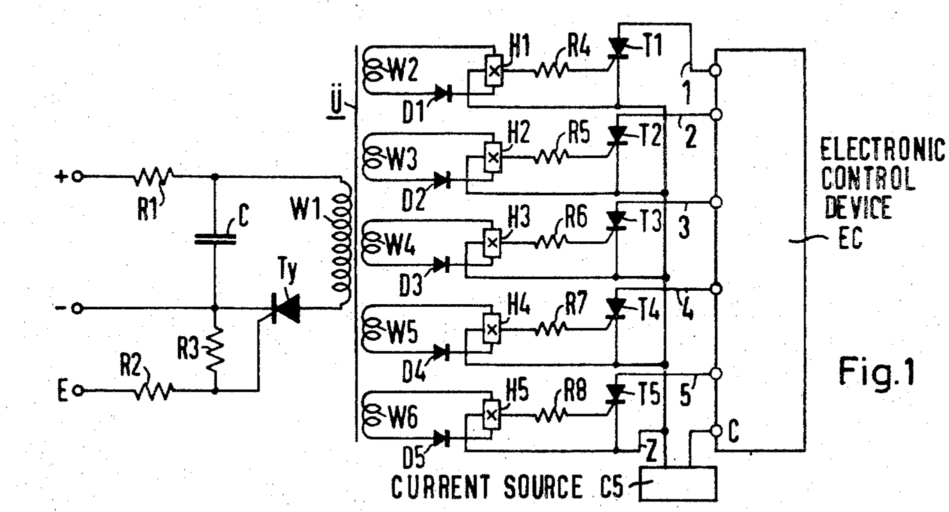

FIG. 1 shows an inductive transformer U which has a primary winding W1 and secondary windings W2 to W6. The Hall circuit of each Hall generator is connected to the control circuit of a thyristor T1 to T5 which defines the control input of an electronic control device, the connection being effected via a current limiting resistor R4 to R8. The primary winding W1 is series-connected with a thyristor Ty in the discharge circuit of a capacitor C that is connected, via a series resistance R1, to a DC voltage source. The control electrode of the thyristor is connected with the tap of a voltage divider consisting of component resistors R2 and R3; a control voltage is applied to the input of said voltage divider. In place of a thyristor, it is also possible to use a transistor, a unijunction transistor or a programmable unijunction transistor. The circuitry is to be adapted to the peculiarity of the individual semiconductor components. Circuitry with a programmable unijunction transistor is particularly suitable when the reading of the measured data is to be effected in synchronism with some other process.

Figure 2:
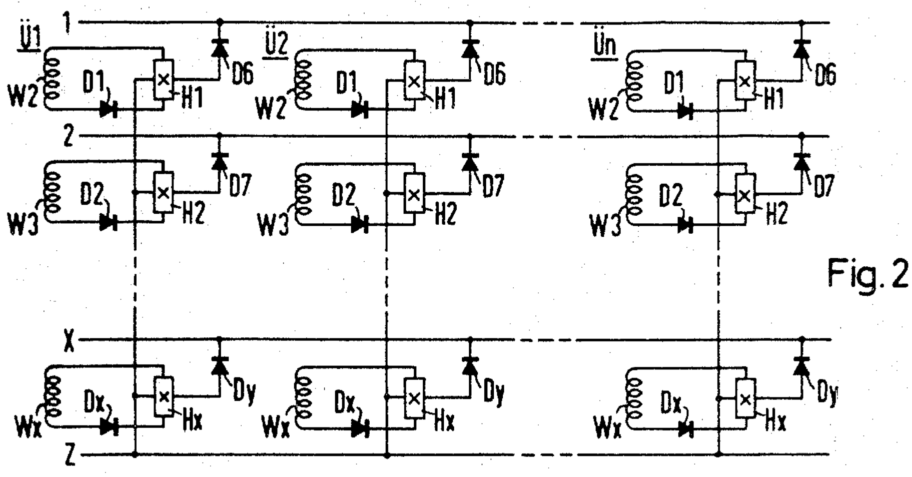
FIG. 2 is a schematic circuit diagram of a system in which the Hall-electrode circuits of several Hall generators are interconnected through decoupling diodes.

FIG. 2 shows how the Hall circuits of Hall generators are connected to the secondary windings of the transformers U1 to U*n*. Several such circuit arrangements may be connected together, according to a type of cross bar distributor. For lucidity, only the secondary circuits of transformers U1 to U*n* are shown. Each secondary winding W2 to W*x* of the transformer is connected to the series connection of a diode D1 to D*x* and a Hall generator H1 to H*x*. At one of their Hall electrodes, all of the Hall generators are connected to a common return bus or main Z. The other Hall electrodes of the Hall generators are connected, via a decoupling diode D6 to Dy, to a control bus 1 to X, one control bar being provided for each of the secondary winding coordinated to the same code positions of the information carriers.

Figure 3:
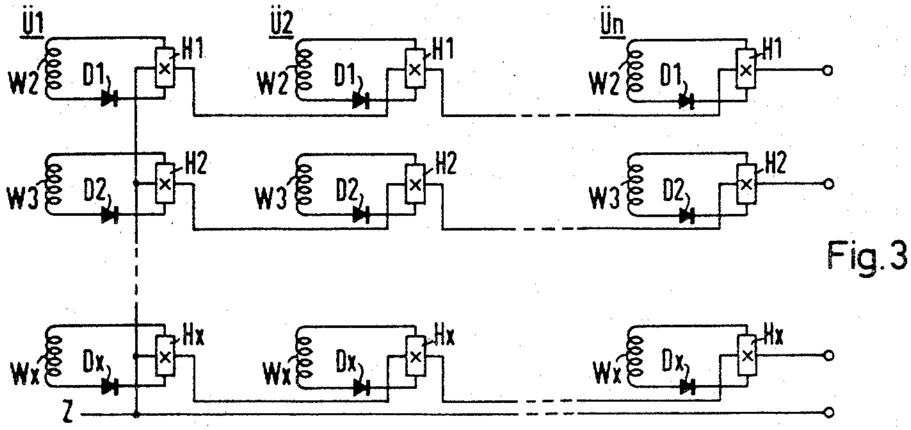
FIG. 3 shows a circuit diagram with several Hall electrode circuits directly connected with one another.
Figure 4:
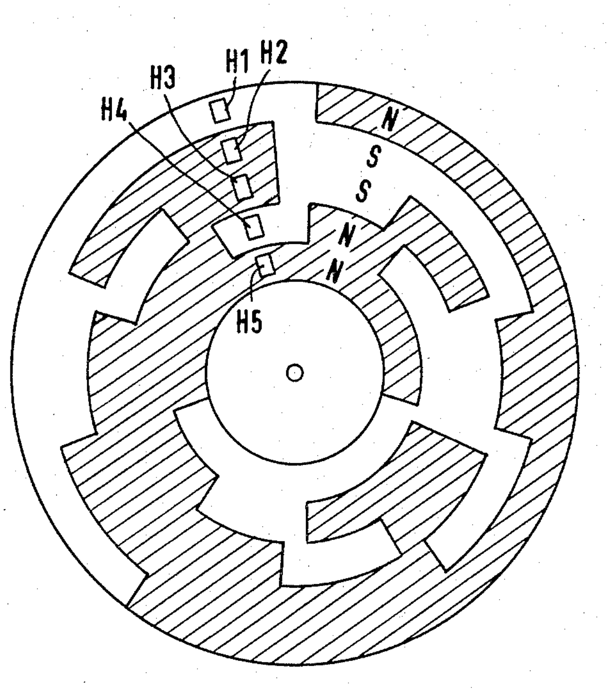
FIG. 4 is a plan view of a code disc with five Hall generators coordinated to the five tracks of the disc.

FIG. 3 shows a circuit arrangement in which the Hall circuits of all Hall generators H1 to Hn are connected in series to the respective secondary windings W2 to W*x*. Each such respective series connection is connected with the control input of the electronic control device.

In the circuit arrangement according to FIG. 1, the capacitor C is charged via the series resistor R1. As soon as a read-out of the measuring data is to take place, a control signal is supplied to input E and fires the thyristor Ty. Thereupon, capacitor C discharges through the primary winding W1 of transformer U and through the load circuit of the thyristor. The dischange time constant is selected to be very low so that a short voltage pulse is induced in the secondary windings W2 to W6 in a discharge current. This pulse drives a correspondingly high control current pulse through the control circuit of the connected Hall generators H1 to H5. The control current pulse produces a positive or negative Hall voltage pulse, depending upon the particular magnetizing device, in the Hall generators which are coordinated to the code positions of an information carrier, designed as a code disc. Due to the very short duration of the control current pulse, its amplitude may be so selected that the produced Hall voltage is sufficient for a direct control of semiconductor components.

Corresponding to the five illustrated Hall generators H1 to H5, the code disc has five code positions which constitute, for example in a circular code disc, five tracks adjacent to each other in the radial direction. The circular code disc is divided into ten equal segments, corresponding to numerals 1 to 10. An appropriate arrangement of magnets with different polarities on the individual tracks within a segment makes it possible to represent any numeral between 1 to 10 by means of a digital signal. When such a reading method is used it is important that, in order to prevent error readings, all Hall generators coordinated to one code disc be controlled simultaneously. This is accomplished in an advantageous manner by the circuit device according to the invention. Due to the fact that the Hall generators are connected to the galvanically separated, individual secondary windings, the desired freedom as to electric potential of the Hall generators will also be obtained.

In a measuring device that supplies measured data with several data positions, each position is provided with a transformer whose number of Hall generators corresponds to the number of tracks on the code disc. In FIG. 2, the Hall circuits of the Hall generators of several transformers U1 to U*n* are interconnected according to a type of cross bar distributor. The thyristors, which are connected in series to the primary windings of the transmitters, are fired in time sequence by appropriate control pulses, so that the capacitor discharge current induces in the secondary windings W2 to W*x* a voltage which drives a control current pulse through the control circuit of the Hall generators. The Hall voltage produced by the Hall generators arrives, via decoupling diodes D6 to D*y* at the control mains 1 to X and at the return circuit bar Z. The control inputs of the electric control device are connected to the control mains 1 to X.

Measuring devices which are employed in installations that use easily volatile and combustible materials must be safe from the occurrence of electrical sparks which could ignite an explosive gas mixture that might be present. The circuit arrangement according to the invention, can fulfill these requirements in a simple manner, through an appropriate rating of the resistors on the primary side of the transformer. Thus the load current for capacitors C supplied from the outside may be selected through a corresponding rating of the series resistors R1 to be so low that no electric spark may occur. The capacitors, the transformers and the Hall generators may be embedded in plastic so that the high currents which occur in these circuit components will not constitute any hazard.

To those skilled in the art it will be obvious upon a study of this disclosure that various other modifications are applicable and hence that the invention may be given embodiments other than those particularly illustrated and described herein, without departing from the essential features of the invention and within the scope of the claims annexed hereto.

I claim:

1. Hall generator system for read-out of magnetized information carriers with several code positions, comprising Hall generators having each a pair of control-current terminals and a pair of Hall electrodes for furnishing a code-responsive Hall voltage; a signal input circuit having a chargeable capacitor, a discharge circuit connected across said capacitor and comprising a controllable semiconductor switching member, an inductive transformer having a primary winding series connected with said switching member in said discharge circuit, said transformer having secondary windings connected with said control current terminals of said respective Hall generators, and an electronic control device having controlling input circuit means connected to said Hall electrodes of said respective Hall generators.

2. In a system as claimed in claim 1 for series reading of several equal information carriers, all of said Hall generators being connected with one of their Hall electrodes to a common return circuit bus and the Hall generators which are connected with the secondary windings coordinated to the same code positions of the information carriers decoupling diodes connecting the respective other Hall electrodes to control busses provided for the respective secondary windings.

3. In a system as claimed in claim 1 for series reading of several information carriers, whereby those Hall generators that are connected to secondary windings are coordinated to the same one of the respective code positions of the information carriers having their respective Hall electrode circuits connected in series with each other.

* * * * *